United States Patent
Mayr et al.

(10) Patent No.: US 9,151,352 B2
(45) Date of Patent: Oct. 6, 2015

(54) DEVICE FOR VIBRATION-DAMPING MOUNTING OF A FLUID ASSEMBLY AND ASSOCIATED FLUID ASSEMBLY

(75) Inventors: Matthias Mayr, Rettenberg (DE); Andreas Weh, Sulzberg (DE)

(73) Assignee: Robert Bosch GmbH, Stuttgart (DE)

( * ) Notice: Subject to any disclaimer, the term of this patent is extended or adjusted under 35 U.S.C. 154(b) by 158 days.

(21) Appl. No.: 13/496,551

(22) PCT Filed: Jul. 20, 2010

(86) PCT No.: PCT/EP2010/060479
§ 371 (c)(1),
(2), (4) Date: May 10, 2012

(87) PCT Pub. No.: WO2011/032747
PCT Pub. Date: Mar. 24, 2011

(65) Prior Publication Data
US 2012/0223211 A1    Sep. 6, 2012

(30) Foreign Application Priority Data
Sep. 18, 2009  (DE) .......................... 10 2009 029 569

(51) Int. Cl.
*F16B 35/00* (2006.01)
*H01Q 1/12* (2006.01)
(Continued)

(52) U.S. Cl.
CPC ............... *F16F 1/3732* (2013.01); *F16F 15/08* (2013.01); *F16F 2228/08* (2013.01)

(58) Field of Classification Search
CPC ..................................................... F16F 1/3732
USPC ......... 267/140.2, 140.3, 141.2, 293; 248/634, 248/635, 659
See application file for complete search history.

(56) References Cited

U.S. PATENT DOCUMENTS 2,241,026 A * 5/1941 Wylie ........................ 267/141.5
2,830,780 A   4/1958 Schloss
(Continued)

FOREIGN PATENT DOCUMENTS

DE   100 36 575 A1   2/2002
DE   102 45 797 A1   4/2004
(Continued)

OTHER PUBLICATIONS

International Search Report corresponding to PCT Application No. PCT/EP2010/060479, mailed Oct. 20, 2010 (German and English language document) (7 pages).

*Primary Examiner* — Jonathan Liu
*Assistant Examiner* — Chiedu Chibogu
(74) *Attorney, Agent, or Firm* — Maginot, Moore & Beck LLP

(57) ABSTRACT

A device for vibration-damping mounting of a vehicle brake system fluid assembly in a receiving opening includes a stay bolt, an elastic damping element in the form of a sleeve through which the stay bolt passes, a clamping sleeve guided by the stay bolt, and a screw element having an internal thread. The stay bolt comprises a connecting pin and a threaded shank having an external thread onto which the screw element can be screwed in order to move the clamping sleeve axially on the stay bolt towards the elastic damping element. The clamping sleeve and the screw element are in the form of a one-piece clamping element having a bearing shoulder, wherein the axial force generated by the clamping element as a result of the screwing-on movement acts via the bearing shoulder on the elastic damping element. A fluid assembly includes at least one such device for vibration-damping mounting.

8 Claims, 4 Drawing Sheets

(51) Int. Cl.
*F16M 1/00* (2006.01)
*F16F 1/373* (2006.01)
*F16F 15/08* (2006.01)

(56) References Cited

U.S. PATENT DOCUMENTS

| | | | | |
|---|---|---|---|---|
| 3,448,949 | A | * | 6/1969 | Kelley ........................ 267/140.3 |
| 4,306,708 | A | * | 12/1981 | Gassaway et al. ......... 267/141.3 |
| 4,358,098 | A | | 11/1982 | Ceseri |
| 4,732,519 | A | * | 3/1988 | Wagner .......................... 411/337 |
| 4,848,032 | A | * | 7/1989 | Ballor et al. .................... 49/350 |
| 5,020,951 | A | * | 6/1991 | Smith ............................ 411/107 |
| 5,570,867 | A | * | 11/1996 | Norkus .......................... 248/635 |
| 5,584,628 | A | * | 12/1996 | Bernoni ........................... 411/84 |
| 5,609,329 | A | * | 3/1997 | Scholl ............................ 267/141 |
| 5,683,215 | A | * | 11/1997 | Gaignard et al. ............... 411/34 |
| 5,765,819 | A | * | 6/1998 | Hummel ........................ 267/153 |
| 5,820,115 | A | * | 10/1998 | Stevenson et al. ............ 267/293 |
| 6,098,949 | A | * | 8/2000 | Robinson ...................... 248/635 |
| 6,354,578 | B1 | * | 3/2002 | Nakatsukasa et al. ........ 267/258 |
| 7,438,350 | B1 | * | 10/2008 | Peterson et al. .............. 296/191 |
| 7,926,780 | B2 | * | 4/2011 | Yeh et al. ...................... 248/632 |
| 8,123,308 | B2 | * | 2/2012 | Schlitzkus et al. .......... 303/119.2 |
| 8,137,041 | B2 | * | 3/2012 | Zhou ............................. 411/353 |
| 2003/0155809 | A1 | * | 8/2003 | Schlitzkus et al. .......... 303/119.3 |
| 2005/0206058 | A1 | * | 9/2005 | Masterson et al. ........... 267/293 |
| 2008/0157447 | A1 | | 7/2008 | Sobajima et al. |
| 2008/0240852 | A1 | * | 10/2008 | Weh et al. ..................... 403/388 |

FOREIGN PATENT DOCUMENTS

| | | | | |
|---|---|---|---|---|
| DE | 10 2005 046 631 A1 | | 4/2007 | |
| JP | 10252732 A | * | 9/1998 | .............. F16B 37/04 |
| JP | 2004-521276 A | | 7/2004 | |
| JP | 2006-501417 A | | 1/2006 | |
| JP | 2006-300110 A | | 11/2006 | |
| JP | 2007085431 A | * | 4/2007 | |
| JP | 2009-510350 A | | 3/2009 | |

\* cited by examiner

DEVICE FOR VIBRATION-DAMPING MOUNTING OF A FLUID ASSEMBLY AND ASSOCIATED FLUID ASSEMBLY

This application is a 35 U.S.C. §371 National Stage Application of PCT/EP2010/060479, filed on Jul. 20, 2010, which claims the benefit of priority to Serial No. DE 10 2009 029 569.0, filed on Sep. 18, 2009 in Germany, the disclosures of which are incorporated herein by reference in their entirety.

BACKGROUND

The disclosure relates to a device for vibration-damping mounting of a fluid assembly and to an associated fluid assembly.

For example, DE 100 36 575 A1 describes a device for elastic mounting of a hydraulic assembly of a vehicle brake system in a vehicle. The device described comprises a stay bolt, a sleeve-shaped damping element which is engaged through by the stay bolt and has a receiving groove which is open to the outside and can be inserted into an associated receiving opening of a fastening bracket, a clamping sleeve which is guided by the stay bolt, and a screw element with an internal thread. The stay bolt can be connected via a connecting journal to the assembly and has a threaded shank with an external thread, onto which the screw element can be screwed, in order to move the clamping sleeve axially on the stay bolt against the damping element in such a way that, in the clamped state, the damping element is both widened radially and shortened axially.

SUMMARY

The device for vibration-damping mounting of a fluid assembly has the advantage, in contrast, that the clamping sleeve and the screw element with an internal thread are configured as a single-piece clamping element with a bearing shoulder, the axial force which is generated by the clamping element as a result of the screwing-on movement onto a threaded shank with an external thread of a stay bolt acting via the bearing shoulder on an elastic damping element. The device for vibration-damping mounting of a vehicle assembly, in particular a fluid assembly of a vehicle brake system, in an associated receiving opening therefore comprises the stay bolt which engages through the sleeve-shaped and elastic damping element, and the clamping element with bearing shoulder, clamping sleeve and screw element. The elastic damping element serves to avoid direct contact between a holder and the rigid parts of the device for vibration-damping mounting of a fluid assembly. To this end, the elastic damping element has a receiving groove which is open to the outside and is inserted into the associated receiving opening. In addition, the stay bolt has a connecting journal, via which the device can be connected to the vehicle assembly. As a result of the threaded shank with external thread, the clamping element can be screwed onto the stay bolt by way of the screw element with internal thread, in such a way that the clamping element is moved with the bearing shoulder and the clamping sleeve axially on the stay bolt against the damping element, in order to move the elastic damping element into a clamped state, in which it is both widened radially and shortened axially. Embodiments of the device for vibration-damping mounting of a fluid assembly make it possible advantageously to reduce the number of components and to reduce the required mounting space, since the clamping element can be of more compact and therefore shorter configuration.

A vehicle assembly, in particular fluid assembly of a vehicle brake system, has the advantage that it is held via at least one device according to the disclosure in a vibration-free manner in a corresponding receiving opening of a bracket which is fastened on the vehicle side, the at least one device being connected via a receiving hole to a housing of the vehicle assembly. By embodiments of the at least one device for vibration-damping mounting of a fluid assembly, the receiving groove, which is open to the outside, of the damping element is pressed into the corresponding receiving opening of the fastening bracket, as a result of which the position of the vehicle assembly in the starting position is defined. By tightening of the clamping element with bearing shoulder, clamping sleeve and screw element, the damping element is compressed axially and widened radially, in order to produce a positively locking connection, as a result of which the vehicle assembly is secured.

By way of the vibration-damping mounting of the vehicle assembly, embodiments of the disclosure advantageously make it possible to suppress or damp a transmission of vibrations from the assembly to the body of the vehicle. Said vibrations can be caused, for example, by an electric motor which is provided for actuating pumps on the assembly. For example, a brake pressure at the wheel brakes can be modulated by the pump operation if used in a hydraulic brake system. The mechanical and/or hydraulic vibrations which are produced here can be damped and an annoying perception of them by the vehicle occupants can be avoided by the vibration-damping mounting.

Advantageous improvements of the device for vibration-damping mounting of a fluid assembly and of the fluid assembly are possible by way of the measures and developments described herein.

It is particularly advantageous that a disk is arranged between the bearing shoulder and the damping element, which disk is configured in such a way that the friction between the elastic damping element and the disk is higher than the friction between the disk and the bearing shoulder. The disk has the functions of axially compressing the elastic damping element during screwing on of the clamping element and at the same time preventing the disk from corotating when it bears against the elastic damping element. A disk of simple construction of this type can advantageously be produced simply and inexpensively as a bulk good. One possibility of realizing low friction between the disk and the bearing shoulder consists, for example, of configuring an undercut on the bearing shoulder in such a way that there is a defined annular rest on the disk.

In an embodiment of the device according to the disclosure, the receiving groove which is open to the outside divides the damping element into two asymmetrical sections of different axial lengths, the longer section facing the vehicle assembly. As a result of the asymmetrical design of the damping element, the displacement travel of the vehicle assembly from a starting position to the fastening position is advantageously reduced. As a result, the installation space which is taken up by the fluid assembly can be advantageously reduced.

In a further embodiment of the device according to the disclosure, the single-piece clamping element is configured in such a way that the bearing shoulder acts on the damping element only when the clamping sleeve has dipped below the receiving groove which is open to the outside. During insertion into the receiving opening of the fastening bracket, the elastic damping element is deformed inwardly in the region of the receiving groove which is open to the outside, on account of the different part dimensions. In conventional embodiments, a gap can be formed between the screw element and a stop shoulder of the stay bolt, which gap lies precisely below said receiving groove and into which the elastic damping element can therefore be clamped and squeezed out. In addition, the elastic material in the gap can lead to the torque decreasing in the screw assembly under use conditions. The embodiment according to the disclosure advantageously prevents too pronounced an expansion of the elastic damping element to the inside, since the gap and the deformed section of the damping element are situated at different axial positions, with the result that the undesirable clamping and squeezing out of the damping element during the screwing-on operation can advantageously be prevented.

In a further embodiment of the device according to the disclosure, a first annular collar of greater diameter is formed on the stay bolt between the connecting journal and the threaded shank, one end side of which first annular collar forms a supporting shoulder, by way of which the device is supported on the housing of the assembly in the installed state. Furthermore, the other end side of the first annular collar can form a stop shoulder for the end side of the clamping sleeve. The first annular collar therefore advantageously makes a supporting face for stipulating an optimum installation depth of the stay bolt and a stop face for the clamping element available.

In a further embodiment of the device according to the disclosure, a second annular collar of greater diameter is formed on the stay bolt between the supporting shoulder and the bearing shoulder, which second annular collar interacts with a receiving groove, open to the inside, of the elastic damping element in such a way that the elastic damping element is held in a defined position after being pushed onto the stay bolt during the preassembly, with the result that further elements for captive securing can advantageously be omitted.

In a further embodiment of the device according to the disclosure, at least one region of the external thread on the threaded shank is configured in such a way that the result at this at least one region is an increased clamping action between the screwed-on screw element and the threaded shank. At the at least one region, the external thread on the threaded shank can have, for example, a changed lead, in order to achieve the increased clamping action. A first region with an increased clamping action can be positioned, for example, on the threaded shank in such a way that a prestressed state of the damping element is indicated by the increased clamping action and the screw element is screwed onto the threaded shank to such an extent that the internal thread of the screw element is covered completely by the external thread of the stay bolt and an open end side of the threaded shank projects beyond the screw element. As a result, damage of the device during connection of the connecting journal to the vehicle assembly can advantageously be avoided. In addition, the prestressed state of the damping element can be implemented by the region with an increased clamping action being reached, in such a way that the cavity is formed, into which the damping element can yield when the damping element is inserted via the receiving groove which is open to the outside into the corresponding receiving opening. Furthermore, captive securing of the clamping element, for example during the transport of the device, can be implemented by the increased clamping. A second region with an increased clamping action can be positioned, for example, on the threaded shank in such a way that a clamped state of the damping element is indicated by the increased clamping action and the screw element is screwed onto the threaded shank to such an extent that the end side of the clamping sleeve bears against the bearing shoulder.

In an embodiment of the vehicle assembly according to the disclosure, the connecting journal of the stay bolt of the at least one device can be pressed or screwed or calked into at least one receiving hole of the housing of the vehicle assembly.

BRIEF DESCRIPTION OF THE DRAWINGS

Advantageous embodiments of the disclosure are shown in the drawings and will be described in the following text. In the drawings, identical designations denote components or elements which perform identical or analogous functions.

DETAILED DESCRIPTION

Figure 1:
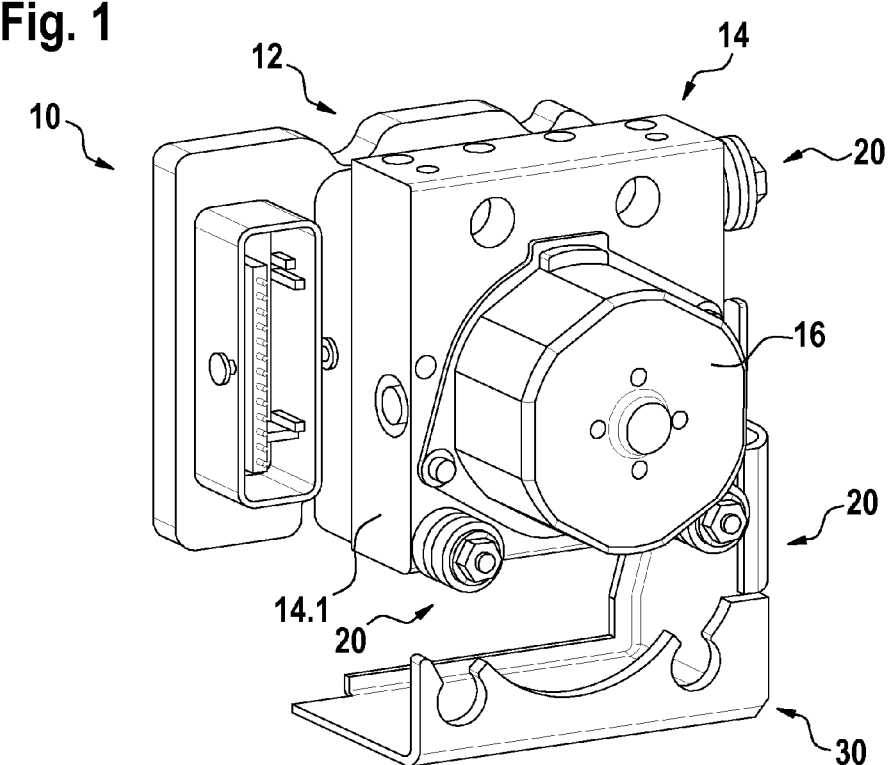
FIG. 1 shows a diagrammatic perspective illustration of a fluid assembly with one exemplary embodiment of a device according to the disclosure for vibration-damping mounting of a fluid assembly and one exemplary embodiment of a corresponding fastening bracket before being connected to the fluid assembly.
Figure 2:
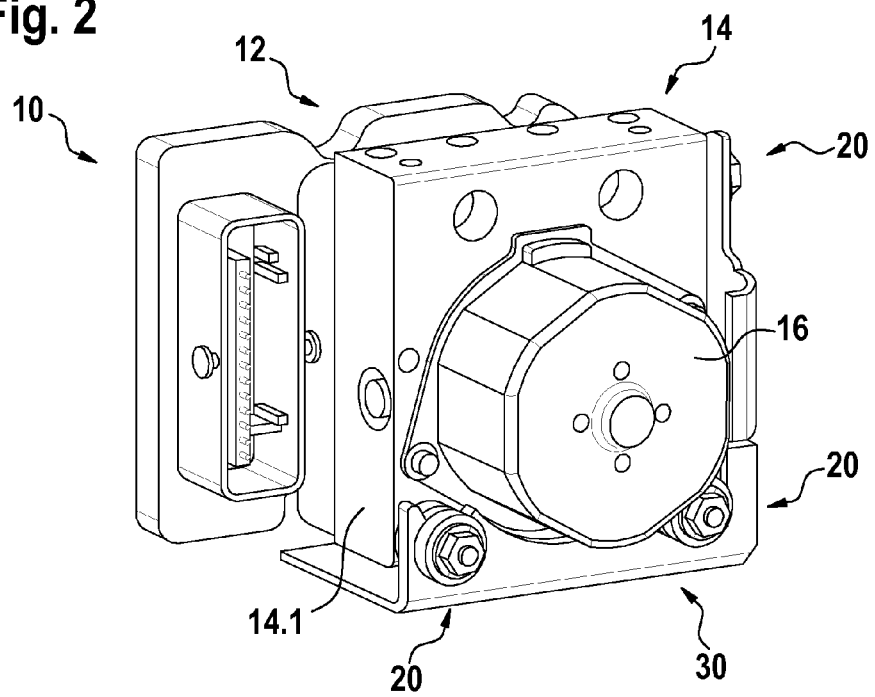
FIG. 2 shows a diagrammatic perspective illustration of the fluid assembly with the exemplary embodiment of the device for vibration-damping mounting of a fluid assembly and the exemplary embodiment of the corresponding fastening bracket after being connected to the fluid assembly.

As can be seen from FIGS. 1 and 2, a fluid assembly 10 which is used, for example, in an antilock brake system (ABS) or an antiskid system (ASR system) or an electronic stability program system (ESP system) comprises as a rule an electronic assembly 12 or control unit and a fluid region which comprises a fluid assembly 14 with fluid components (not shown), such as fluid actuating elements, fluid channels, pumps, etc., and a housing 14.1 and an electric pump motor 16. The construction of fluid assemblies 10 of this type of regulated vehicle brake systems is sufficiently well known and therefore does not have to be described further in detail. The fluid assembly 10 serves, for example, to modulate the brake pressure in connected wheel brakes (not shown) with consideration of the braking request of the driver and the slip conditions at the wheels of the vehicle.

Figure 3:
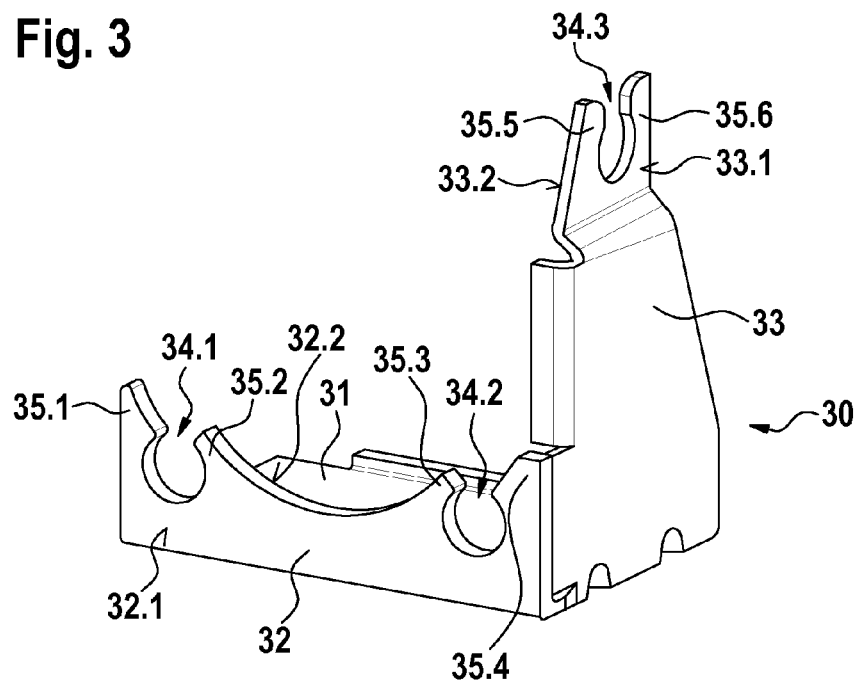
FIG. 3 shows a diagrammatic perspective illustration of one exemplary embodiment of a fastening bracket for the fluid assembly shown in FIGS. 1 and 2.
Figure 8:
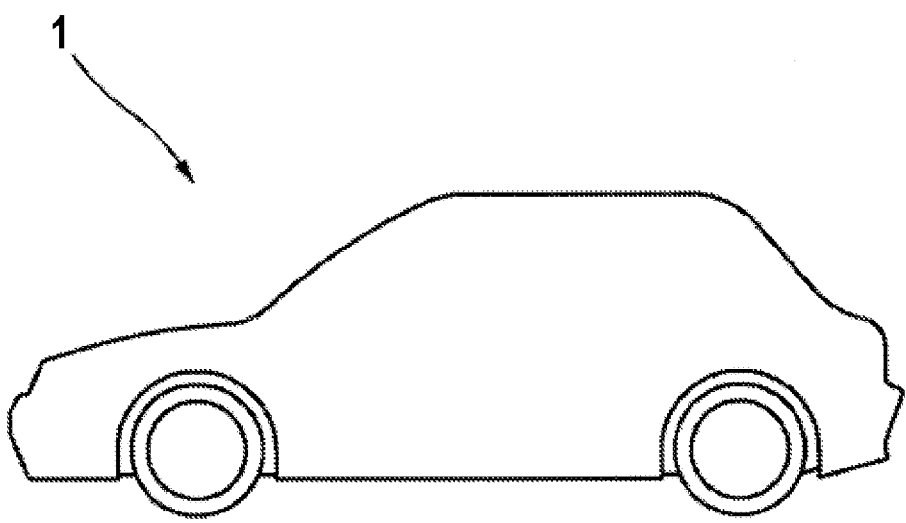
FIG. 8 shows a schematic illustration of a vehicle.

The fluid assembly 10 can be mounted in a vibration-damped manner via at least one device 20 according to the disclosure to a bracket 30 which is anchored fixedly to a body of the vehicle 1 (FIG. 8). In the exemplary embodiment which is shown, three devices 20 are used for vibration-damping mounting of the vehicle assembly 10 on the bracket 30. As can be seen from FIGS. 1 to 3, the bracket 30 has a base plate 31, a first horizontally oriented limb 32 which is connected to the base plate 31, and a second limb 33 which extends perpendicularly with respect to the former and is connected to the base plate 31. The first limb 32 has two receiving openings 34.1 and 34.2 which are oriented in a first spatial direction and the second limb 33 has a third receiving opening 34.3 which is oriented in a second spatial direction. The receiving openings 34.1, 34.2, 34.3 are configured as shell-shaped rounded portions which are open in a mounting direction and have claws 35.1, 35.2, 35.3, 35.4, 35.5, 35.6 which are arranged to the side of them and constrict the receiving openings 34.1, 34.2, 34.3. The three devices 20 for vibration-damping mounting of the vehicle assembly 10 are fastened to the assembly housing 14.1, which devices 20 are inserted in the respectively assigned receiving openings 34.1, 34.2, 34.3 in the hooked-in state. In the region of the receiving openings 34.1, 34.2, 34.3, the corresponding side faces 32.1, 32.2 and 33.1, 33.2 of the two receiving limbs 32, 33 can be provided with embossed portions (not shown), in order to increase the adhesion friction between the devices 20 for vibration-damping mounting of the vehicle assembly 10 and the bracket 30. As an alternative to the exemplary embodiment which is shown, according to further embodiments (not shown), the bracket 30 can comprise only one limb with at least one receiving opening or three limbs with at least one receiving opening.

Figure 4:
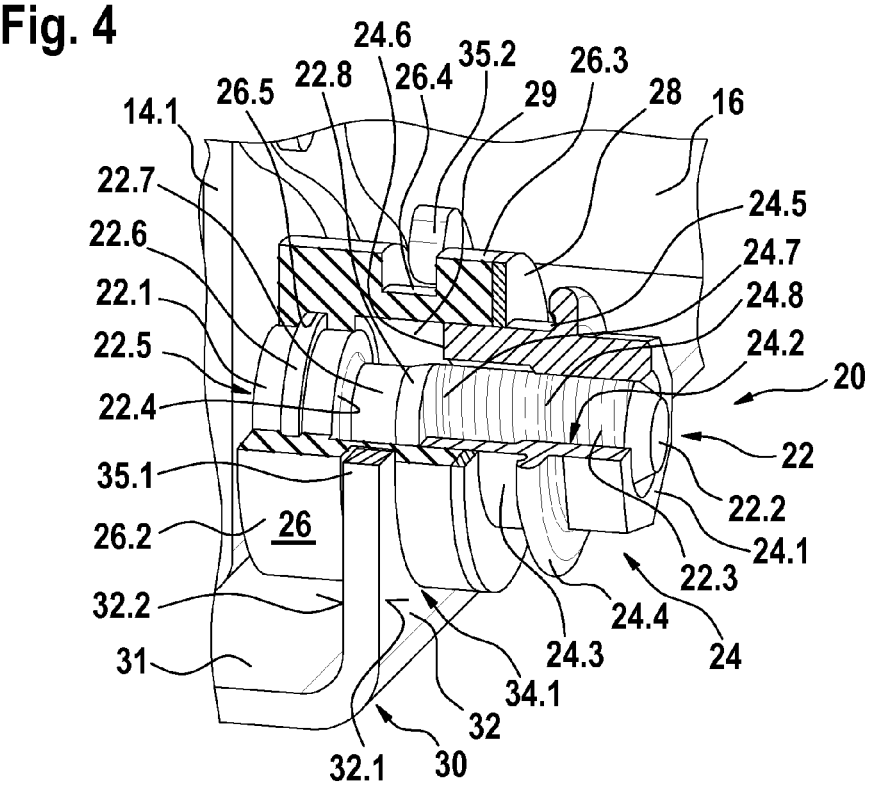
FIG. 4 shows a diagrammatic detailed illustration of a bearing arrangement in a partially sectioned perspective view with one exemplary embodiment of a device for vibration-damping mounting of a fluid assembly from FIGS. 1 and 2 in the fastening bracket from FIG. 3 in a prestressed state.
Figure 5:
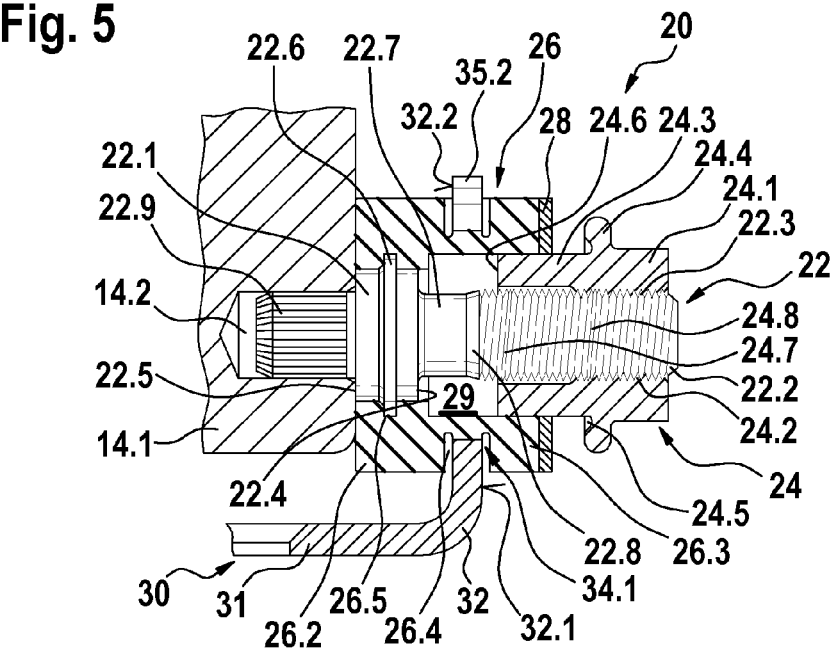
FIG. 5 shows a diagrammatic sectional illustration of the bearing arrangement from FIG. 4 with the exemplary embodiment of the device for vibration-damping mounting of a fluid assembly in the prestressed state.
Figure 6:
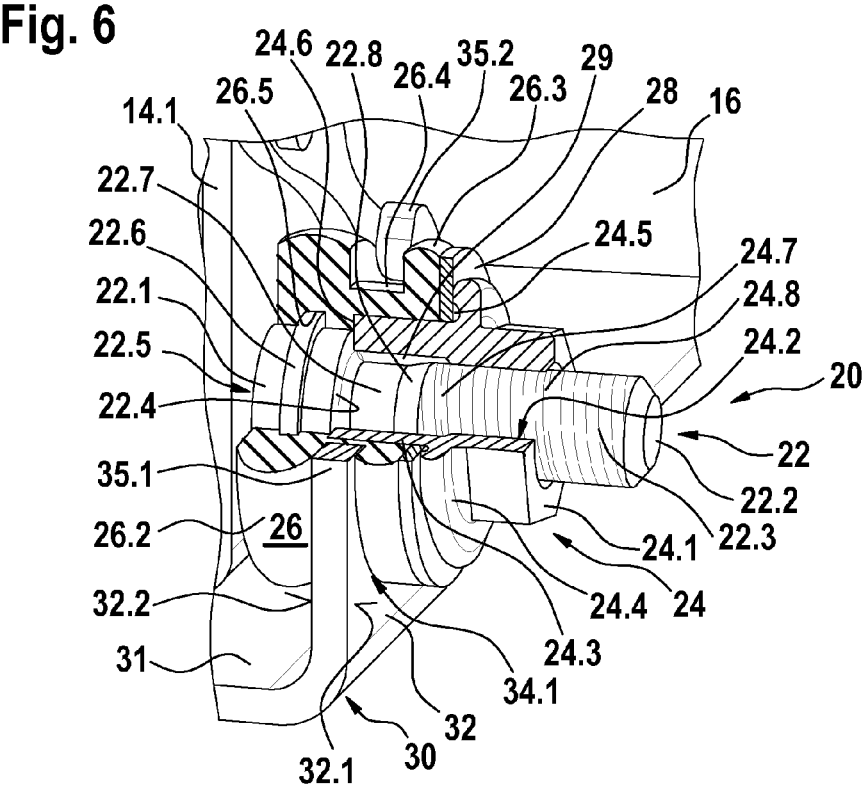
FIG. 6 shows a diagrammatic detailed illustration of the bearing arrangement from FIGS. 4 and 5 in a partially sectioned perspective view with the exemplary embodiment of the device for vibration-damping mounting of a fluid assembly from FIGS. 1 and 2 in the fastening bracket from FIG. 3 in a clamped state.
Figure 7:
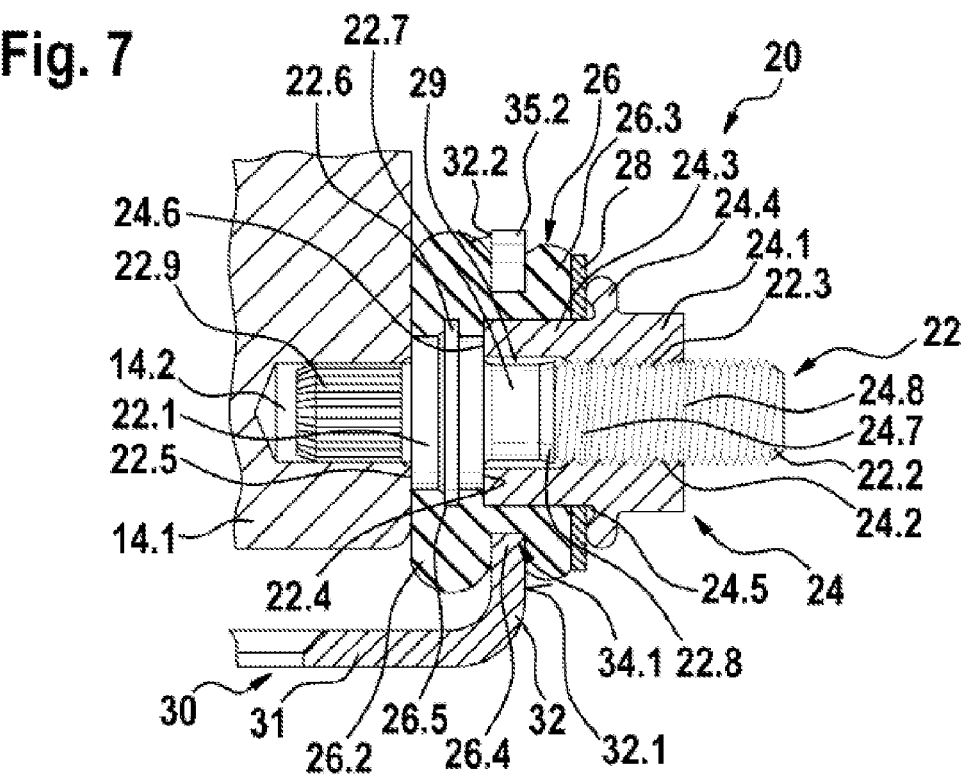
FIG. 7 shows a diagrammatic sectional illustration of the bearing arrangement from FIG. 6 with the exemplary embodiment of the device for vibration-damping mounting of a fluid assembly in the clamped state.

In the following text, one exemplary embodiment of the device 20 for vibration-damping mounting of the vehicle assembly 10 will be described with reference to FIGS. 1 to 4, which device 20 is inserted into a first receiving opening 34.1 of the first receiving limb 32. Here, FIGS. 4 and 5 show the inserted device 20 in a prestressed state, and FIGS. 6 and 7 show the inserted device 20 in a clamped state.

As can be seen from FIGS. 1 to 4, the device 20 comprises a stay bolt 22, a sleeve-shaped and elastic damping element 26 which is engaged through by the stay bolt 22 and has a receiving groove 26.4 which is open to the outside and is inserted into the associated receiving opening 34.1, 34.2, 34.3, the receiving opening 34.1 here, and a single-piece clamping element 24 which is guided by the stay bolt 22 and, according to the disclosure, comprises a screw element 24.1 with an internal thread 24.2, a clamping sleeve 24.3 and a bearing shoulder 24.4. At one end, the stay bolt 22 comprises a connecting journal 22.9 which is grooved longitudinally and is received non-rotatably in a receiving hole 14.2 of the housing 14.1 of the fluid assembly 10. To this end, the connecting journal 22.9 of the stay bolt 22 can be pressed or screwed or calked into the corresponding receiving hole 14.2 of the housing 14.1 of the vehicle assembly 10. Behind the connecting journal 22.9, a first annular collar 22.1 of greater diameter is formed on the stay bolt 22, one end side of which first annular collar 22.1 forms a supporting shoulder 22.5, by way of which the device 20 is supported on the housing 14.1 of the fluid assembly 10 in the installed state. The other end side of the first annular collar 22.1 forms a stop shoulder 22.4 for the clamping sleeve 24.3. A second annular collar 22.6 of greater diameter is formed on the stay bolt 22 between the supporting shoulder 22.5 and the bearing shoulder 24.4 of the first annular collar 22.1, which second annular collar 22.6 interacts with a receiving groove 26.5, open to the inside, of the elastic damping element 26 in such a way that the elastic damping element 26 is held in a defined position after being pushed onto the stay bolt 22. At the other end, the stay bolt 22 has a threaded shank 22.2 with an external thread 22.3, onto which the screw element 24.1 of the clamping element 24 is screwed. In the exemplary embodiment which is shown, two regions 24.7, 24.8 of the external thread 22.3 on the threaded shank 22.2 are configured in such a way that the result in these regions 24.7, 24.8 is increased clamping between the screwed-on screw element 24.1 and the threaded shank 22.2. There can thus be graining, for example, on the external thread 22.3. In the exemplary embodiment which is shown, however, the lead of the external thread 22.3 on the threaded shank 22.2 is changed in the two regions 24.7, 24.8, in order to achieve the increased clamping action. A first region 24.8 with an increased clamping action is positioned on the threaded shank 22.2 in such a way that the prestressed state of the damping element 26 is indicated by the increased clamping action and the screw element 24.1 is screwed onto the threaded shank 22.2 to such an extent that the internal thread 24.2 of the screw element 24.1 is completely covered by the external thread 22.3 of the stay bolt 22.2 and an open end side of the threaded shank 22.2 projects beyond the screw element 24.1. As a result, damage of the device during connection of the connecting journal to the vehicle assembly can advantageously be avoided. In addition, the prestressed state of the damping element 26 can be implemented by the first region 24.8 with an increased clamping action being reached, in such a way that a cavity 29 is formed, into which the damping element 26 can yield when the damping element 26 is inserted via the receiving groove 26.4 which is open to the outside into the corresponding receiving opening 34.1. Furthermore, captive securing of the clamping element 24 can be implemented by the increased clamping, since the screw element 24.1 and therefore the clamping element 24 remain in their position, for example during transport. A second region 24.7 with an increased clamping action can be positioned, for example, on the threaded shank 22.2 in such a way that the clamped state of the damping element 26 is indicated by the increased clamping action and the screw element 24.1 is screwed onto the threaded shank 22.2 to such an extent that the end side 24.6 of the clamping sleeve 24.3 bears against the bearing shoulder 22.4 of the first annular collar 22.1.

Between the first annular collar 22.1 and the threaded shank 22.2, the diameter of the stay bolt 22 is tapered in an intermediate region 22.7, with the result that the cavity 29 is produced between the stay bolt 22 and the damping element 26, which cavity 29 is covered by the clamping sleeve 24.3 of the clamping element 24 when the clamping element 24 is screwed onto the threaded shank 22.2 of the stay bolt 22 until in contact with the bearing shoulder 24.4. The small external diameter of the stay bolt 22 is increased in the intermediate region 22.7 to the greater external diameter in the region of the external thread 22.3 by way of a transition chamfer 22.8. The receiving groove 26.4 which is open to the outside divides the elastic damping element 26 into two asymmetrical sections 26.2, 26.3 of different axial lengths, the longer end section 26.2 facing the vehicle assembly 10 and the shorter end section 26.3 facing the clamping element 24. In the state shown, the elastic damping element 26 is received in an unclamped state on the stay bolt 22 and encloses by way of its longer end section 26.2 the first annular collar 22.1, which engages in a fitting manner into its inner cross section, and encloses by way of the receiving groove which is open to the inside the second annular collar 22.6. The external diameter of the clamping element 24 which is screwed onto the stay bolt 22 has the same diameter in the region of the clamping sleeve 24.3 as the second annular collar 22.6, and reaches in a fitting manner through the shorter end section 26.3 of the elastic damping element 26.

As can be seen, furthermore, from FIGS. 1 to 4, a disk 28 is arranged between the bearing shoulder 24.4 of the clamping element 24 and the elastic damping element 26, the external diameter of which disk 28 is adapted to the external diameter of the elastic damping element 26, and the internal diameter of which disk 28 is adapted to the external diameter of the clamping sleeve 24.3. The disk 28 is configured in such a way that the friction between the elastic damping element 26 and the disk 28 is higher than the friction between the disk 28 and the bearing shoulder 24.4. An undercut 24.5 is therefore formed on the bearing shoulder 24.4 in such a way that there is a defined annular contact of the bearing shoulder 24.4 with the disk 28. The disk 28 advantageously avoids the elastic damping element 26 corotating during the screwing-on movement of the clamping element 24.

In the prestressed state of the damping element 26, which state is shown in FIGS. 4 and 5, the clamping element 24 is screwed onto the threaded shank 22.2 of the stay bolt 22 to such an extent that the clamping sleeve 24.3 reaches substantially completely through the smaller end section 26.3 of the elastic damping element 26. In the prestressed state of the damping element 26, the fluid assembly 10 is hooked into the fastening bracket 30 in such a way that in each case one device 20 for vibration-damping mounting of the vehicle assembly 10 is pressed via the receiving groove 26.4, open to the outside, of the corresponding elastic damping element 26 into a corresponding receiving opening 34.1, 34.2, 34.3 of the fastening bracket 30. In this operation, the elastic damping element 26 can yield into the cavity 29 between the first annular collar 22.1 and the partially screwed-on clamping element 24. Starting from this inserted and prestressed state of the damping element 26, which state is shown in FIGS. 4 and 5, the clamping element 24 can be screwed on further and can be moved axially on the stay bolt 22 against the elastic damping element 26 in such a way that the elastic damping element 26 is transferred into a clamped state which is shown in FIGS. 6 and 7. The screwing operation is concluded by the end side 24.6 of the clamping sleeve 24.3 coming into contact with the bearing shoulder 24.4 of the first annular collar 22.1.

As can be seen from FIGS. 6 and 7, the elastic damping element 26 is both widened radially and shortened axially in the clamped state and the open end side 24.6 of the clamping sleeve 24.3 bears against the bearing shoulder 24.4 of the first annular collar 22.1. The radial widening and the axial shortening produce a positively locking connection between the damping element 26 and the region of the side faces 32.1, 32.2 of the corresponding limb 32 which is arranged around the receiving opening 34.1, as a result of which positively locking connection the fluid assembly 10 is mounted in a vibration-damped manner in the fastening bracket 30. In this clamped state, the cavity 29 is covered by the clamping sleeve 24.3 and the elastic damping element 26 is deformed in such a way that the receiving groove 26.4 which is open to the outside and is partially reached around by the claws 35.1, 35.2 of the receiving opening 34.1 acts with radial pressure on the inside of the receiving opening 34.1. The two end sections 26.2 and 26.3 of the elastic damping element 26 act in contrast with axial pressure on the two side faces 32.1, 32.2 of the first limb 32. The axial clamping of the elastic damping element 26 therefore achieves a non-positive and positively locking connection to the first limb 31 of the bracket 30, the embossing (not shown) of the side faces 32.1, 32.2 in the region of the receiving opening 34.1 having an assisting effect. In addition, the fluid assembly 10 is displaced on account of the axial shortening in the direction of the associated side limb 32. Here, the single-piece clamping element 24 is configured in such a way that the bearing shoulder 24.4 acts on the elastic damping element 26 via the disk 28 only when the clamping sleeve 24.3 has dipped below the receiving groove 26.4 which is open to the outside, with the result that clamping and squeezing out of the elastic damping element 26 can be avoided advantageously.

Embodiments of the disclosure make it advantageously possible to reduce the mounting space, since the fluid assembly is displaced less during tightening. In addition, embodiments of the disclosure advantageously prevent it being possible for the elastic damping element to be clamped and squeezed out and for the tightening torque in the screw assembly to decrease under use conditions.

The invention claimed is:

1. A vibration-damping mounting device for a vehicle assembly having an associated receiving opening, the device comprising:
   a stay bolt including a connecting journal, via which the device is configured to be connected to the vehicle assembly, and a threaded shank with an external thread;
   a sleeve-shaped elastic damping element which is engaged through by the stay bolt and has a receiving groove which is open to the outside and is configured to be inserted into the associated receiving opening;
   a clamping sleeve which is guided by the stay bolt;
   a bearing shoulder;
   a screw element with an internal thread, which is screwed onto the threaded shank in order to move the clamping sleeve axially on the stay bolt against the elastic damping element in such a way that, in a clamped state, the elastic damping element is both widened radially and shortened axially; and
   a disk arranged between the bearing shoulder and the elastic damping element, the clamping sleeve extending through the disk and into the elastic damping element with the disk being configured in such a way that a first friction force between the elastic damping element and the disk is greater than a second friction force between the disk and the bearing shoulder,
   wherein the clamping sleeve and the screw element are configured as a single-piece clamping element defining an axis with the bearing shoulder extending substantially perpendicularly to the axis and seamlessly from the clamping sleeve and the screw element, an axial force which is generated by the clamping element as a result of a screwing-on movement acting via the bearing shoulder on the elastic damping element,
   wherein the external thread on the threaded shank includes at least one region having a changed lead, which is different from adjacent leads, configured to increase clamping action between the screw element and the threaded shank at a position of the screw element on the threaded shank at which the at least one region having the modified lead engages the internal thread of the screw element, and wherein an undercut is defined in the bearing shoulder and provides a defined annular contact region between the bearing shoulder and the disk that is spaced apart from the clamping sleeve, and the undercut is disposed between the annular contact region and the clamping sleeve.

2. The device as claimed in claim 1, wherein the receiving groove which is open to the outside divides the elastic damping element into two asymmetrical sections of different axial lengths, a longer section of the two asymmetrical sections has a longer axial length than the other section and is positioned closer to the connecting journal of the stay bolt than the other section.

3. The device as claimed in claim 1, wherein the single-piece clamping element is configured in such a way that the bearing shoulder acts on the elastic damping element only when the clamping sleeve is located axially and radially within the receiving groove which is open to the outside.

4. The device as claimed in claim 1, wherein:
the stay bolt includes a first annular collar of greater diameter than the threaded shank and formed between the connecting journal and the threaded shank, and
one end side of the first annular collar forms a supporting shoulder configured to support the device on a housing of the assembly in an installed state.

5. The device as claimed in claim 4, wherein the other end side of the first annular collar forms a stop shoulder against which an open end side of the clamping sleeve abuts in the clamped state.

6. The device as claimed in claim 4, wherein:
the stay bolt includes a second annular collar of greater diameter than the first annular collar formed between the supporting shoulder and the bearing shoulder,
the elastic damping element includes a receiving groove defined in an inner circumference of the elastic damping element, and
the second annular collar is positioned within the receiving groove in such a way that the elastic damping element is prevented from moving axially relative to the stay bolt by interaction of the receiving groove and the second annular collar.

7. An assembly comprising: at least one vibration-damping mounting device; and a vehicle assembly held to a bracket via the at least one vibration-damping mounting device, wherein the bracket is fastened to a vehicle and has at least one receiving opening in which the at least one vibration-damping mounting device is received, and wherein a housing of the vehicle assembly comprises at least a corresponding receiving hole to which the at least one vibration-damping mounting device is connected,
the at least one vibration-damping mounting device including:
a stay bolt including a connecting journal, via which the at least one vibration-damping mounting device is connected to the vehicle assembly, and a threaded shank with an external thread;
a sleeve-shaped and elastic damping element which is engaged through by the stay bolt and has a receiving groove which is open to the outside and is inserted into the receiving opening;
a clamping sleeve which is guided by the stay bolt;
a bearing shoulder;
a screw element with an internal thread, which is screwed onto the threaded shank in order to move the clamping sleeve axially on the stay bolt against the elastic damping element in such a way that, in a clamped state, the elastic damping element is both widened radially and shortened axially; and
a disk arranged between the bearing shoulder and the elastic damping element, the clamping sleeve extending through the disk and into the elastic damping element with the disk being configured in such a way that a first friction force friction between the elastic damping element and the disk is greater than a second friction force between the disk and the bearing shoulder,
wherein the clamping sleeve and the screw element are configured as a single-piece clamping element defining an axis with the bearing shoulder extending substantially perpendicularly to the axis and seamlessly from the clamping sleeve and the screw element, an axial force which is generated by the clamping element as a result of a screwing-on movement acting via the bearing shoulder on the elastic damping element,
wherein the external thread on the threaded shank includes at least one region having a changed lead, which is different from adjacent leads, configured to increase clamping action between the screw element and the threaded shank at a position of the screw element on the threaded shank at which the at least one region having the modified lead engages the internal thread of the screw element, and wherein an undercut is defined in the bearing shoulder and provides a defined annular contact region between the bearing shoulder and the disk that is spaced apart from the clamping sleeve, and the undercut is disposed between the annular contact region and the clamping sleeve.

8. The assembly as claimed in claim 7, wherein the connecting journal of the stay bolt of the at least one device is pressed or screwed or calked into the receiving hole of the housing of the vehicle assembly.

\* \* \* \* \*